(12) United States Patent
Perrett et al.

(10) Patent No.: US 10,574,567 B2
(45) Date of Patent: *Feb. 25, 2020

(54) MODELING A BORDER GATEWAY PROTOCOL NETWORK

(71) Applicant: ARIA NETWORKS LIMITED, Bath (GB)

(72) Inventors: Jay Perrett, Wiltshire (GB); Omar Al Assil, Wiltshire (GB)

(73) Assignee: ARIA Networks Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,645

(22) Filed: Dec. 18, 2018

(65) Prior Publication Data

US 2019/0149457 A1    May 16, 2019

Related U.S. Application Data

(63) Continuation of application No. 15/531,271, filed as application No. PCT/GB2015/053645 on Nov. 27, 2015, now Pat. No. 10,193,796.

(30) Foreign Application Priority Data

Nov. 28, 2014 (GB) .................................. 1421185.8

(51) Int. Cl.
*H04L 12/703* (2013.01)
*H04L 12/733* (2013.01)
(Continued)

(52) U.S. Cl.
CPC ............ *H04L 45/28* (2013.01); *H04L 45/021* (2013.01); *H04L 45/126* (2013.01); *H04L 45/54* (2013.01);
(Continued)

(58) Field of Classification Search
CPC ............ H04L 41/0654; H04L 41/0659; H04L 41/0663; H04L 41/0668; H04L 41/0672;
(Continued)

(56) References Cited

U.S. PATENT DOCUMENTS 7,916,729 B2 *  3/2011  Mohapatra .......... H04L 12/4641
                                                    370/225
7,978,708 B2 *  7/2011  Filsfils .................... H04L 45/02
                                                    370/238

(Continued)

FOREIGN PATENT DOCUMENTS

CN          104036324 A      9/2014
EP          1 005 195 A1     5/2000
(Continued)

OTHER PUBLICATIONS

Naas et al., "A Novel MILP Formulation for Planning GMPLS Transport Networks with Conversionand Regeneration Capabilities", 2008 IEEE, BNSDOCID:. Apr. 5, 2008, pp. 569-574.

(Continued)

*Primary Examiner* — Sharad Rampuria
(74) *Attorney, Agent, or Firm* — Eric L. Sophir; Dentons US LLP

(57) ABSTRACT

Methods and systems for generating a model of a transit autonomous system (AS) network. The method comprises analyzing the routing information base for each border gateway protocol (BGP) node in the AS and storing, for each BGP router, (i) a routing table; and, (ii) a prioritized list of next hops for each prefix based on the appropriate best path algorithm. The model can be used to (a) determine how traffic will be routed through the transit AS in steady state and failure scenarios (e.g. when one or more links or nodes/routers have failed); and/or (b) determine how traffic should be routed through the transit AS (e.g. determine the best routes) in steady state and failure scenarios. The optimal (Continued)

routing of the traffic in a particular steady state or failure scenario (as determined by the model) can be compared to the actual routing of the traffic in the steady state or failure scenario (as determined by the model) to determine what changes to make to the transit AS to achieve the optimum routing.

20 Claims, 14 Drawing Sheets

(51) Int. Cl.
  *H04L 12/755* (2013.01)
  *H04L 12/741* (2013.01)
  *H04L 12/751* (2013.01)
  *H04L 12/715* (2013.01)
(52) U.S. Cl.
  CPC .............. *H04L 45/02* (2013.01); *H04L 45/04* (2013.01); *H04L 45/122* (2013.01)
(58) Field of Classification Search
  CPC ......... H04L 45/22; H04L 45/28; H04B 10/03; H04B 10/032; H04B 10/035; H04B 10/038; H04J 14/0287; H04J 14/0289; H04J 14/029; H04J 14/0291; H04J 14/0293; H04J 14/0294; H04J 14/0295; H04J 14/0297; H04J 2203/006
  See application file for complete search history.

(56) References Cited

U.S. PATENT DOCUMENTS

| | | | |
|---|---|---|---|
| 8,055,791 | B2 | 11/2011 | Pan et al. |
| 8,228,786 | B2* | 7/2012 | Vasseur .................. H04L 45/02 370/219 |
| 8,265,061 | B1 | 9/2012 | Smith et al. |
| 8,811,172 | B1 | 8/2014 | Sella |
| 9,172,614 | B2* | 10/2015 | Perrett .................. H04L 41/12 |
| 9,641,397 | B2 | 5/2017 | Suzuki et al. |
| 2003/0147400 | A1 | 8/2003 | Devi |
| 2006/0013127 | A1 | 1/2006 | Izaiku et al. |
| 2006/0050634 | A1 | 3/2006 | Gous |
| 2006/0092940 | A1 | 5/2006 | Ansari et al. |
| 2007/0025730 | A1 | 2/2007 | Frankel |
| 2007/0177506 | A1 | 8/2007 | Singer et al. |
| 2008/0080374 | A1 | 4/2008 | Nuzman et al. |
| 2008/0225751 | A1 | 9/2008 | Kozat et al. |
| 2008/0320166 | A1 | 12/2008 | Filsfils et al. |
| 2010/0040365 | A1 | 2/2010 | Kit Leung |
| 2010/0042449 | A1 | 2/2010 | Thomas |
| 2011/0004455 | A1 | 1/2011 | Caviglia et al. |
| 2011/0122776 | A1 | 5/2011 | Jacob et al. |
| 2011/0149973 | A1 | 6/2011 | Esteve Rothenberg et al. |
| 2011/0173486 | A1 | 7/2011 | Yagyu |
| 2011/0307899 | A1 | 12/2011 | Lee et al. |
| 2012/0093005 | A1 | 4/2012 | Li et al. |
| 2012/0185229 | A1 | 7/2012 | Perrett |
| 2012/0222004 | A1 | 8/2012 | Labat et al. |
| 2012/0287937 | A1 | 11/2012 | Kaya et al. |
| 2013/0090124 | A1 | 4/2013 | Panchal et al. |
| 2013/0346578 | A1 | 12/2013 | Varki et al. |
| 2014/0052419 | A1 | 2/2014 | Wang et al. |
| 2014/0078895 | A1 | 3/2014 | Iovanna et al. |
| 2014/0348139 | A1 | 11/2014 | Gomez Martinez |
| 2015/0281100 | A1 | 10/2015 | Kurita |
| 2015/0333993 | A1 | 11/2015 | Welin et al. |
| 2015/0365328 | A1 | 12/2015 | Luke et al. |
| 2016/0036693 | A1 | 2/2016 | Galdy et al. |
| 2016/0036886 | A1 | 2/2016 | Ito |
| 2016/0191370 | A1 | 6/2016 | Wood |
| 2018/0077024 | A1 | 3/2018 | Zhang |

FOREIGN PATENT DOCUMENTS

| | | |
|---|---|---|
| EP | 2521392 A1 | 11/2012 |
| EP | 2602961 A1 | 6/2013 |
| EP | 2742648 A1 | 6/2014 |
| EP | 2996285 A1 | 3/2016 |
| GB | 2386033 A | 9/2003 |
| WO | 2008/112252 A1 | 9/2008 |
| WO | 2011/036500 A2 | 3/2011 |
| WO | 2011/085823 A1 | 7/2011 |
| WO | 2012116760 A1 | 9/2012 |
| WO | 2013/024269 A1 | 2/2013 |
| WO | 2014/086978 A1 | 6/2014 |
| WO | 2014/161571 A1 | 10/2014 |
| WO | 2014/189952 A2 | 11/2014 |

OTHER PUBLICATIONS

Sabella et al., "A Multilayer Solution for Path Provisioning in New-Generation Optical/MPLS Networks", Journal of Lightwave Technology, vol. 21, No. 5, May 2003, pp. 1141-1155.
Iovanna et al., "Multilayer Control for Packet-Optical Networks [Invited]", J. Opt. Commun. Netw./vol. 5, No. 10/Oct. 2013, pp. A86-A99.
Written Opinion of the International Searching Authority issued in International Application No. PCT/GB2015/053633 dated Feb. 5, 2016, 6 pages.
International Search Report issued in International Application No. PCT/GB2015/053633 dated Feb. 5, 2016, 10 pages.
Mehmet Balman et al., "A Flexible Reservation Algorithm for Advance Network Provisioning". 2010 ACM/IEEE International Conference for High Performance Computing, Networking, Storage and Analysis; Nov. 13-19, 2010; New Orleans, LA, USA, IEEE, Piscataway, NJ, USA, Nov. 13, 2010, pp. 1-11, XP031808370, ISBN: 978-1-4244-7557-5, 12 pages.
European Examination Report, dated Sep. 26, 2018, issued in corresponding European Application No. 15 804 923.9, 9 pages.
Patents Act 1977: Search Report under Section 17(5) issued in Application No. GB1603041.3 dated May 3, 2017, 4 pages.
"Network Functions Virtualisation (NFV); Architectural Framework", ETSI GS NFV 002 V1.1.1, Oct. 2013, pp. 1-21.

* cited by examiner

FIG. 3

MODELING A BORDER GATEWAY PROTOCOL NETWORK

CROSS-REFERENCE TO RELATED APPLICATIONS

This application is a continuation of U.S. patent application Ser. No. 15/531,271, filed May 26, 2017, which is a National Stage of PCT/GB2015/053645, filed Nov. 27, 2015, which claims priority under 35 U.S.C. § 119 to GB Application No. 1421185.8, filed Nov. 28, 2014, all of which are incorporated herein by reference in their entirety.

BACKGROUND

Each device on the Internet is assigned an Internet Protocol (IP) address which allows that device to be located for purposes of communication with other devices. There are two versions of IP that are currently in use—IP version 4 (IPv4) and IP version 6 (IPv6)—which each have their own form of IP address. In particular, an IP version 4 address comprises 32 bits and is divided into 4 octets such that it takes the form A.B.C.D where each of A, B, C, and D is a decimal number between 0 and 255. An IP version 6 address comprises 128 bits and is divided into 8 groups of four hexadecimal numbers such that it takes the form K:L:M:N:O:P:Q:R where each of K, L, M, N, O, P, Q and R is a hexadecimal number between 0000 and FFFF.

Since there are more than 4.2 billion possible IPv4 addresses, if there were no organization of the IP address it would be very difficult to locate a particular IP address in the Internet. Devices would have to keep track of all 4.2 billion addresses and how to get to each address. Accordingly, to make it easier to locate an IP address on the Internet, contiguous IP addresses (in either form) are grouped together into what is referred to as a sub-network or subnet. IP addresses that belong to the same subnet share a certain number of most significant bits (i.e. the first part of their IP addresses are the same) and the remaining least significant bits are used to uniquely identify the device associated with the IP address. Accordingly, an IP address can be divided into a routing prefix (the shared bits) and a host identifier.

A prefix is generally represented by the first address of the subnet, followed by a slash "/" then a number defining how many bits are in the prefix. This number is referred to as the subnet mask. For example 192.168.1.0/24 is an IPv4 prefix that starts at address 192.168.1.0 and covers the first 24 bits of the address, leaving 8 bits to be used for device addresses. Therefore the last address of the subnet is 192.168.1.255. The subnet mask can also be expressed as a dot-decimal notation in the same way as an IP address. For example, a 24 bit subnet mask can be represented in the form 255.255.255.0.

Organizations can be assigned one or more prefixes. All of the prefixes under the control of a single organization form what is referred to an autonomous system (AS). Each AS is assigned a globally unique number referred to as an autonomous system number (ASN) which uniquely identifies the AS. The autonomous systems are connected together to allow communication between autonomous systems.

The autonomous Systems use an Exterior Gateway Protocol (EGP) to exchange routing information and to route traffic between autonomous systems. Border Gateway Protocol (BGP) version four is currently the de-facto standard EGP for inter-AS routing. Each AS uses BGP to notify any other AS that it is connected to of the prefixes that it is responsible for (e.g. has been assigned) and any other prefixes that is knows about. Each AS stores the information about all the prefixes it knows about (e.g. those that are local to it and those that it has learned about from other autonomous systems) and what the possible routes are to each prefix. Each AS then uses one or more metrics to select the best route to each prefix from the list of possible routes. In this way each AS only needs to keep track of each prefix instead of each IP address. However, an EGP (e.g. BGP) typically only indicates the next EGP router in the path and thus another routing protocol may be required to route the traffic between EGP routers.

Autonomous systems can be categorized into one of three types: stub, multihomed or transit. A stub AS is an AS that is connected to only one other AS. A multihomed AS is connected to at least two ASs for backup purposes so that Internet connectivity can be maintained in the event of a failure of connection to one of the autonomous systems. This type of AS does not, however, allow traffic from one AS to pass through on its way to another AS. In contrast, a transit AS is an AS that is connected to multiple autonomous systems and provides connections through itself to other autonomous systems. For example, AS1 may use AS2, a transit AS, to connect to AS3. A transit AS uses BGP to route traffic between autonomous systems (e.g. traffic from AS1 to AS3). A transit AS will typically also be able to be the originator and/or termination point of traffic.

A transit AS comprises a complex network of routers using BGP (which are referred to herein as BGP routers) to route traffic from one AS to another (including to/from the transit AS itself). The BGP routers are typically configured to send traffic via the most efficient route through the transit AS network so that the traffic spends as little time as possible in the transit AS network. However, transit AS networks are not generally well designed to deal with failures in the network (e.g. failure of a link or router), particularly multiple failures. This is partly because transit AS networks are so complicated that is not immediately evident how traffic will be routed upon a failure. As a result, a failure or multiple failures can have a catastrophic effect on the network. For example, traffic normally sent over a failed link may be re-routed over an already busy link which may cause the busy link to become overloaded bringing performance over that link down to an unacceptable level.

Accordingly, there is a desire to be able to determine the effect of failures (e.g. node link, or peering failures) on a transit AS. In particular, there is a desire to be able to determine how traffic will be re-routed through a transit AS network upon a failure or multiple failures.

The embodiments described below are not limited to implementations which solve any or all of the disadvantages of known network analysis systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and systems for generating a model of a transit autonomous system (AS) network. The method comprises analyzing the routing information base for each border gateway protocol (BGP) node in the AS and storing, for each BGP router, (i) a routing table; and, (ii) a prioritized list of next hops for each prefix based on the appropriate best path algorithm. The model can be used to (a) determine how traffic will be routed through the transit AS in steady state or failure scenarios (e.g. when one or more links or nodes/routers have failed); and/or (b) determine how traffic should be routed through the transit AS (e.g. determine the best routes) in steady state or failure scenarios. The optimal routing of the traffic in a particular steady state or failure scenario (as determined by the model) can be compared to the actual routing of the traffic in the steady state or failure scenario (as determined by the model) to determine what changes to make to the transit AS to achieve the optimum routing.

A first aspect provides a system to determine a route of a service through a transit autonomous system, the system comprising: a memory; and a processor in communication with the memory, the processor configured to: receive a topology of the transit autonomous system, the topology comprising a plurality of nodes, the plurality of nodes comprising at least two border gateway protocol nodes; receive a routing information base for each border gateway protocol node, each routing information base comprising at least one route for each of plurality of internet protocol prefixes, each route comprising a next hop associated with a border gateway protocol node; generate, for each border gateway protocol node, a prioritized next hop table from the routing information base for the border gateway protocol node, the prioritized next hop table comprising a prioritized list of next hops for each internet protocol prefix; store the prioritized next hop table for each border gateway protocol node in the memory; generate, for each border gateway protocol node, a routing table from the prioritized next hop table, the routing table comprising the best next hop for each internet protocol prefix; store the routing table for each border gateway protocol node in the memory; and determine a route of a service through the transit autonomous system in a failure scenario using the prioritized next hop table and the routing table of the border gateway protocol nodes.

A second aspect provides a computer-implemented method to determine a route of a service through a transit autonomous system, the method comprising: receiving, at a computing-based device, a topology of the transit autonomous system, the topology comprising a plurality of nodes, the plurality of nodes comprising at least two border gateway protocol nodes; receiving, at the computing-based device, a routing information base for each border gateway protocol node, each routing information base comprising at least one route for each of plurality of internet protocol prefixes, each route comprising a next hop associated with a border gateway protocol node; generating, using the computing-based device, for each border gateway protocol node, a prioritized next hop table from the routing information base for the border gateway protocol node, the prioritized next hop table comprising a prioritized list of next hops for each internet protocol prefix; storing the prioritized next hop table for each border gateway protocol node; generating, using the computing-based device, for each border gateway protocol node, a routing table from the prioritized next hop table, the routing table comprising the best next hop for each internet protocol prefix; storing the routing table for each border gateway protocol node; and determining a route of a service through the transit autonomous system in a failure scenario using the prioritized next hop tables and the routing tables of the border gateway protocol nodes.

A third aspect provides a computer readable storage medium having encoded thereon computer readable program code which when run by a computer causes the computer to perform the method of the second aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 2 is a schematic diagram of an example transit AS;

FIG. 3 is a schematic diagram of an example border gateway protocol (BGP) routing information base (RIB) and an example routing table;

FIG. 6 is a flow diagram of an example method for modeling a BGP transit AS;

Figure 1:
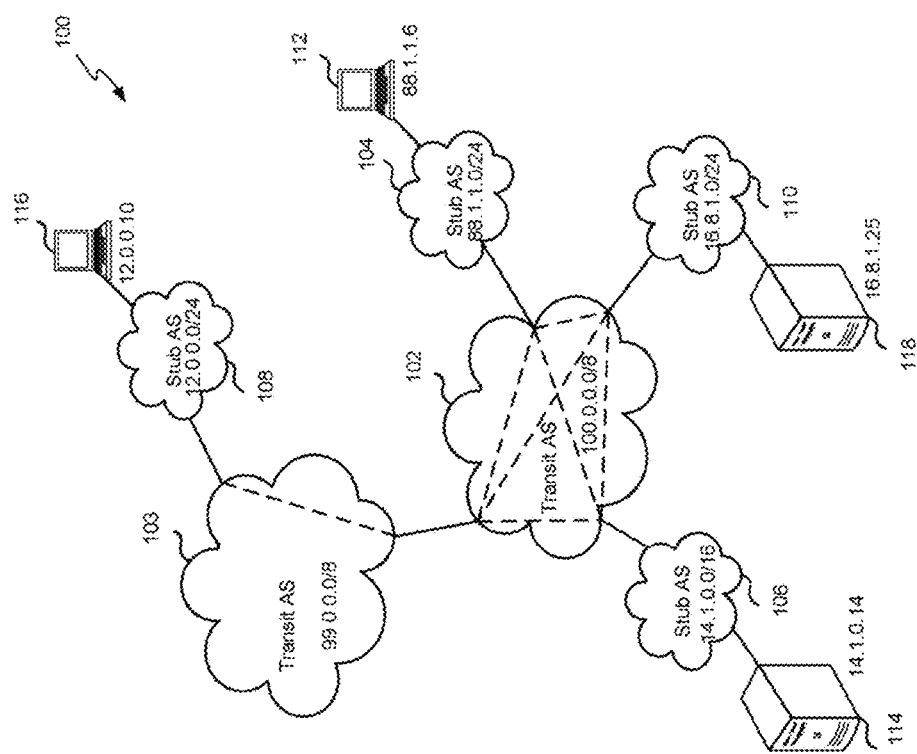
FIG. 1 is a schematic diagram of a system comprising two transit autonomous systems connecting a plurality of stub autonomous systems.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are methods and systems for generating a model of a transit AS that uses border gateway protocol (BGP) to route traffic from one AS to another that can be used to determine how the BGP network will be affected by one or more failures in the network (e.g. how traffic will be routed based on the current configuration of the network) and/or how the BGP network should be configured to best accommodate one or more failures in the network (e.g. how the network should be configured to optimally route services after one or more failures).

Each BGP node/router comprises BGP routing information that lists one or more possible routes for each prefix that the BGP node/router knows about. Each route specifies the next BGP router in the route/path for the particular prefix. The next BGP router is referred to herein as the next hop. The methods described herein for generating a model of a transit AS comprise analyzing the BGP routing information of each BGP node/router in the transit AS system to generate a prioritized next hop list for that BGP node/router. The prioritized next hop table comprises a prioritized list of the possible next hops for each prefix. Once the prioritized next hop tables are generated a routing table is generated for each BGP node/router from the corresponding prioritized next hop table. The routing table comprises only the best (or highest priority) next hop for each prefix.

As described above, the available Internet Protocol (IP) addresses are divided into a plurality of sub-networks or subnets. Each subnet is represented by a prefix which is defined by the first address of the subnet, followed by a slash "/" then a number defining how many bits are in the prefix. This number is referred to as the subnet mask. For example 192.168.1.0/24 is an IPv4 prefix that starts at address 192.168.1.0 and covers the first 24 bits of the address, leaving 8 bits to be used for device addresses.

An organization that wishes to communicate over the Internet is assigned one or more prefixes. The number or size of prefixes assigned may be based on a number of factors including the size of the organization and/or the number of devices that will be connected to the Internet at any one time. All of the prefixes under the control of a single organization form what is referred to an autonomous system (AS). Each AS is assigned a globally unique number referred to as an autonomous system number (ASN) which uniquely identifies the AS. The autonomous systems are connected together to allow communication between autonomous systems.

Each AS uses an Exterior Gateway Protocol (EGP) to exchange routing information and to route traffic between autonomous systems. Border Gateway Protocol (BGP) version four is currently the de facto standard EGP for inter-AS routing. Each AS uses BGP to notify any other AS that it is connected to of the prefixes that it is responsible for (e.g. has been assigned) and any other prefixes that it knows about. Each AS stores the information about all the prefixes it knows about (e.g. those that are local to it and those that it has learned about from other autonomous systems) and what the possible routes are to each prefix. Each AS then uses one or more metrics to select the best route to each prefix from the list of possible routes.

Autonomous systems can be categorized into one of three types: stub, multihomed or transit. A stub AS is an AS that is connected to only one other AS. A multihomed AS is connected to at least two external autonomous systems for backup purposes so that Internet connectivity can be maintained in the event of a failure of connection to one of the autonomous systems. This type of AS does not, however, allow traffic from one AS to pass through on its way to another AS. In contrast, a transit AS is an AS that is connected to multiple autonomous systems and provides connections through itself to other autonomous systems. For example, AS1 may use AS2, a transit AS, to connect to AS3. A transit AS uses BGP to route traffic between autonomous systems (e.g. traffic from AS1 to AS3). In addition to routing traffic between transit autonomous systems, a transit AS itself also can be the source or destination of traffic (e.g. traffic can be sent to/from the transit AS2 to AS1 or AS3).

These concepts are illustrated in FIG. 1 which shows a system 100 comprising two transit autonomous systems 102 and 103 connected to a plurality of stub autonomous systems 104, 106, 108 and 110. Each of the autonomous system 102, 103, 104, 106, 108 and 110 has been assigned an IP prefix. In particular, the transit autonomous systems 102 and 103 have been assigned the prefixes 100.0.0.0/8 and 99.0.0.0/8 respectively, and the stub autonomous systems 104, 106, 108, 110 have been assigned prefixes 88.1.1.0/24, 14.1.0.0/16, 12.0.0.0/24, and 16.8.1.0/24 respectively. Each stub autonomous system 104, 106, 108, 110 has an end-user device 112, 114, 116 and 118 it services which is assigned a network address in the respective prefix. In particular the stub autonomous systems 104, 106, 108 and 110 have end-user devices 112, 114, 116 and 118 which have been assigned IP addresses 88.1.1.6, 14.1.0.14, 12.0.0.10, and 16.8.1.25 respectively.

The autonomous systems 102, 103, 104, 106, 108 and 110 use BGP to exchange routing information. In particular, each autonomous system uses BGP to advertise what prefixes it knows about and how to get to each of them. For example, the first stub autonomous system 104 uses BGP to notify the first transit AS 102 that prefix 88.1.1.0/24 is accessible through it, and the third stub autonomous system 108 uses BGP to notify the second transit AS 103 that the prefix 12.0.0.0/24 is accessible through it. The transit autonomous systems 102 and 103 use BGP to notify all the autonomous systems they are connected to about their own prefixes and the prefixes that they have learned about (i.e. from the other transit AS or the stub autonomous systems).

Then when a transit AS 102 or 103 receives traffic from one AS 102, 103, 104, 106, 108 or 110 destined for another AS 102, 103, 104, 106, 108 or 110 it will route the traffic to the destination through the transit AS 102 or 103 network. For example, if the first transit AS 102 receives traffic from end-user device 112 (stub AS 104) which is destined for end-user device 116 (stub AS 108). The first transit AS 102 will route the traffic through it internal network to the second transit AS 103, the second transit AS 103 will then route the traffic through its internal network to the third stub AS 108 where it is routed to the end-user device 116.

Each transit AS 102, 103 comprises a complex network of routers to route traffic from one AS to another AS.

Figure 2:
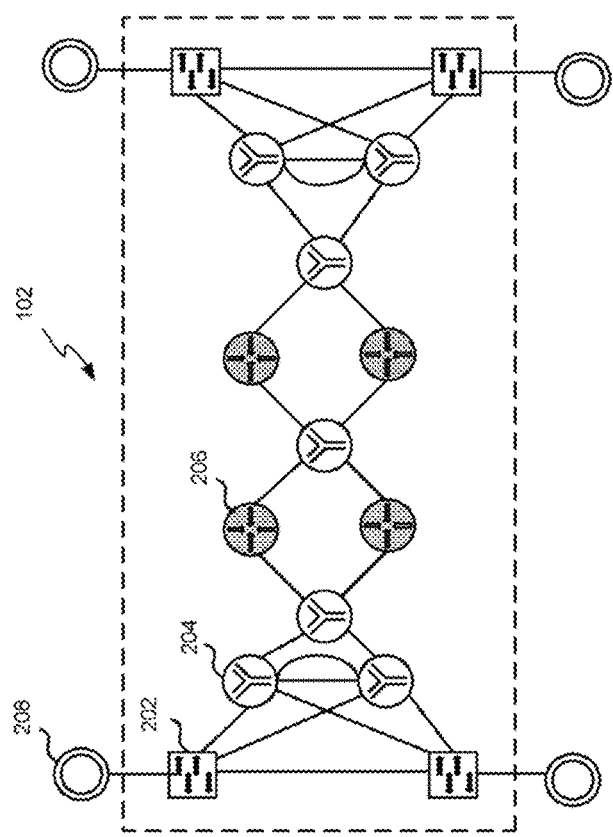

Reference is now made to FIG. 2 which illustrates an example transit AS 102. The transit AS 102 comprises a plurality of interconnected routers or nodes 202, 204 and 206. Each router 202, 204 and 206 can be classified as one of a BGP gateway 202 (also referred to as a BGP border router or a BGP edge router), a BGP core router 204 and an intermediate router 206. A BGP gateway 202 is a router that runs BGP and is connected an external AS. In particular, as shown in FIG. 2, each BGP gateway 202 is typically directly connected an eBGP peer 208 of another AS. The BGP gateway 202 and eBGP peer 208 exchange routing information using external BGP (EBGP) or exterior BGP.

A BGP core router 204 is a router that runs BGP, but is internal to the AS 102. BGP gateways 202 and BGP core routers 204 of the same AS exchange routing information using internal BGP (iBGP). As shown in FIG. 2, the BGP core routers 204 may be directly connected to each other or they may be interconnected through intermediate routers 206 which do not run BGP. The main difference between eBGP and iBGP is the way new routing information is propagated. New routes that are learned via eBGP are distributed to all internal BGP peers and all external peers. Whereas new routes that are learned via iBGP are only distributed to external BGP peers.

When traffic destined for another AS is received from a BGP peer at a BGP gateway the traffic is routed through the transit AS 102 via a series of BGP routers (e.g. BGP gateways, BGP core routers). Where the BGP routers are not directly connected (e.g. they are connected via an intermediate router 206) traffic is routed between BGP routers (e.g. BGP gateways and BGP core routers) using another protocol such as, but not limited to, Internet Protocol (IP).

Each BGP router (BGP gateway 202, BGP core router 204 or BGP peer 208) typically stores two types of routing data: (a) a routing information base (RIB) which comprises a list of the prefixes it knows about and the possible routes to those prefixes; and (b) a routing table which comprises the best (or highest priority route) to each of the prefixes (e.g. next BGP node) to get to each of the prefixes. Each BGP router analyzes the information in the RIB to determine the best route to each prefix.

Figure 3:
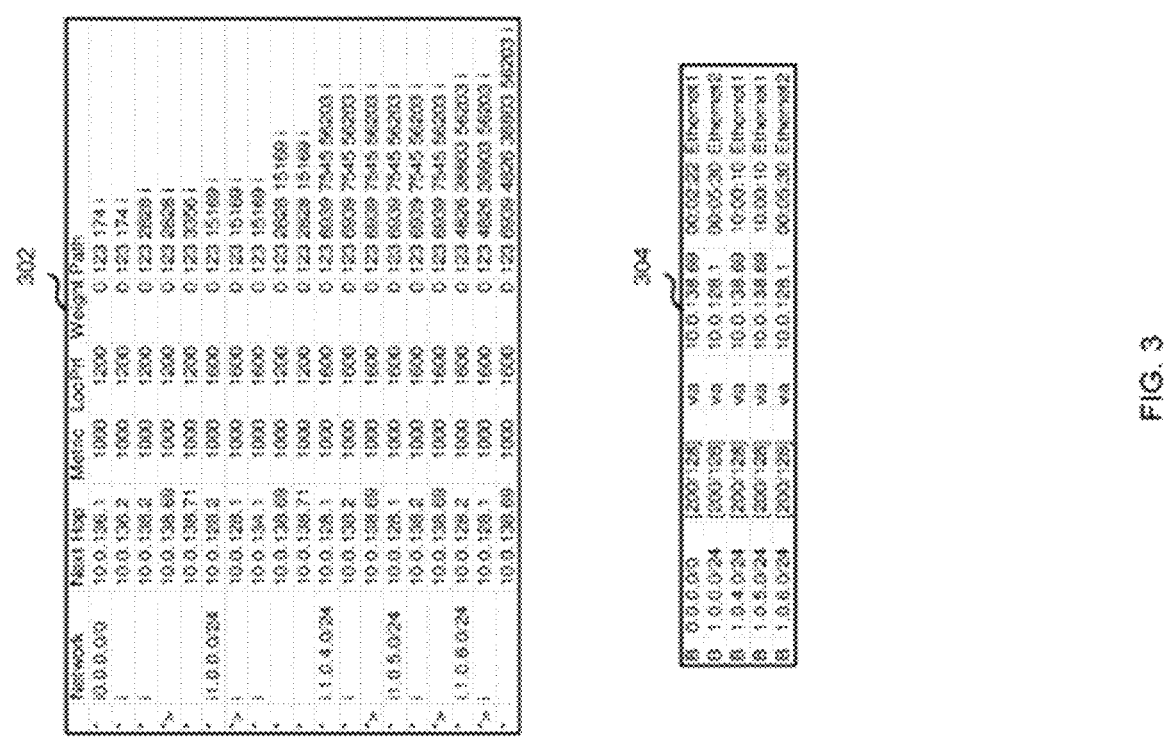

Reference is made to FIG. 3 which illustrates an example of a portion of a BGP RIB 302 and a corresponding routing table 304 for a BGP router. The BGP RIB 302 comprises routing information learned via BGP. In particular the BGP RIB 302 comprises a list of prefixes the router has learned about via BGP and one or more routes to each prefix. The example RIB 302 of FIG. 3 comprises routing information for six prefixes: 0.0.0.0/0 (referred to as the default prefix), 1.0.0.0/24, 1.0.4.0/24, 1.0.5.0/24 and 1.0.6.0/24. For each prefix, the RIB 302 comprises one or more routes to that prefix. In the example of FIG. 3, each route is shown in a line or row of the table and is defined by status information, a next hop, a metric, a local preference, a weight and a path.

In the example of FIG. 3 the status of an entry (e.g. route) in the table is displayed at the beginning of the line or row. In particular, a star "*" indicates the entry is valid, a greater than symbol ">" indicates that is the best route for that prefix, and an "i" indicates the information was learned via iBGP. The next hop is the IP address of the next BGP router in the route to the prefix. The metric is the value of the inter-autonomous system metric. The local preference is a value that can be set by a network administrator to tell the router to prefer one or more routes over other routes. The weight of a route is set via autonomous system filters. The path is the list of autonomous system numbers (ASNs) that are traversed to get to the destination prefix. For example, to get to prefix 1.0.0.0/24 via router 10.0.128.2 the traffic will traverse through AS 123, and AS 15169.

The router selects the best (or highest priority) route for each prefix from the RIB 302 and inserts the best route into the routing table 304. In the example shown in FIG. 3, the "best" route (denoted by the greater than symbol ">") for each prefix has been inserted into a row or entry of the routing table 304. Each entry specifies the protocol that derived the route (e.g. a "B" indicates the route was derived through BGP), the prefix that the entry relates to (e.g. 1.0.0.0/24), metrics (e.g. the first number is the administrative distance of the information source and the second number is the metric for the route), IP address of the next hop (e.g. where to send traffic for that prefix), the time in hours:minutes:seconds since the route was last updated, and the interface (e.g. Ethernet 1 or Ethernet 2) of the router to use to get to the next hop.

It is the routing table 304 that is used by the router to route traffic through the network. For example, if a router/node receives data with a source destination of 1.0.6.1 then the router will look at the routing table 304 to determine the IP address of the next hop (e.g. 10.0.128.1) for the corresponding prefix (e.g. 1.0.6.0/24) and will forward the received data to that IP address.

The BGP routers in a transit AS are typically configured (i) to send traffic via the most efficient route through the transit AS network during steady state conditions (e.g. when all links and nodes/routers in the network are active) so that the traffic spends as little time as possible in the transit AS network; and (ii) to peer with the most appropriate peer routers. However, transit AS networks are not generally well designed to deal with failures in the network (e.g. failure of a link or router), particularly multiple failures. This is partly because transit AS networks are so complicated that is not immediately evident how traffic will be routed upon a failure. As a result, a failure or multiple failures can have a catastrophic effect on the network. For example, traffic normally sent over a failed link may be re-routed over an already busy link which may cause the busy link to become overloaded bringing performance over that link down to an unacceptable level.

Figure 4:
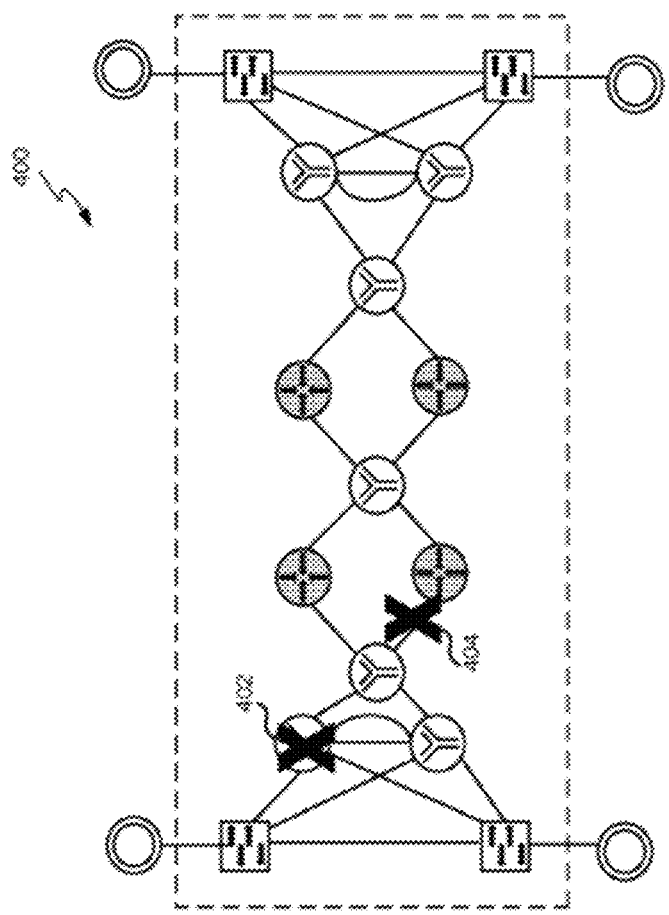
FIG. 4 is a schematic diagram of the transit AS of FIG. 2 with multiple failures.

For example, reference is now made to FIG. 4 which illustrates a transit AS network 400 in a failure scenario. In particular, in FIG. 4 the transit AS network 400 has two failures 402 and 404. The first failure 402 is a node failure and the second failure 404 is a link failure. Without an accurate model it is not evident how traffic typically run over the failed link 404 or via the failed node 402 will be re-routed.

Accordingly, described herein are methods and systems for generating a model of a transit AS network that uses BGP to route traffic from one AS to another that can be used to (a) determine how traffic will be routed through the transit AS in failure scenarios (e.g. when one or more links or nodes/routers have failed); and/or (b) determine how traffic should be routed through the transit AS (e.g. determine the best routes) in failure scenarios. The optimal routing of the traffic in a particular failure scenario (as determined by the model) can be compared to the actual routing of the traffic in the failure scenario (as determined by the model) to determine what changes to make to the transit AS to achieve the optimum routing.

Figure 5:
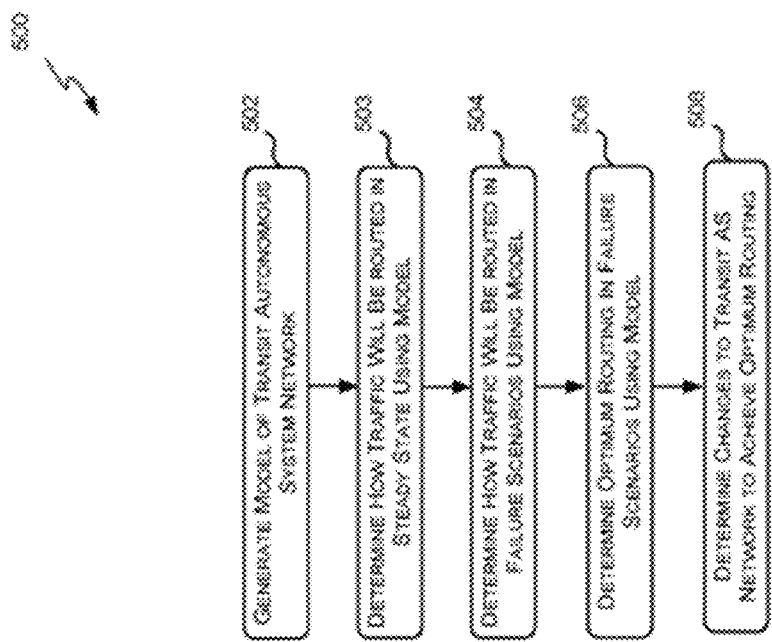
FIG. 5 is a flow diagram of an example method for determining the optimum routing of services in a transit AS with one or more failures.

This method 500 is illustrated in FIG. 5. In particular, the method 500 starts at block 502 where a model of the transit AS network is generated. Generating a model of a transit AS network running BGP has generally been thought to be a difficult if not insurmountable task due to the high number of nodes/routes in the transit AS and the number of routing entries held by each node/router. In May 2014, a full IPv4 BGP table comprises more than 500,000 prefixes. To redistribute addresses to more entities prefixes are continually being further subdivided which is further increasing the number of entries in a BGP table. For example, a single/16 prefix that is further divided can add hundreds of new entries to the BGP table. Even those who have been able to build a model of a transit AS network have been able to model only a specific transit AS network and have not been able to come up with a method of generating a model that can model BGP routing under customizable failure scenarios.

Accordingly, described herein are methods for generating a model of a transit AS network that reduces the complexity of the network and the amount of information stored. In particular, the methods comprise analyzing the RIB information for each BGP router in the AS and storing, for each BGP router, (i) a routing table; and, (ii) a prioritized list of next hops for each prefix. An example method for generating a model of a transit AS network is described with reference to FIGS. 6 and 7. Once a model has been generated, the method 500 proceeds to block 503.

At block 503, the model generated at block 502 is used to determine the routing of traffic in steady state (i.e. when all of the links and nodes in the AS are operational). This allows a baseline utilization of each link to be determined and it also allows the source contributors to the utilization to be identified. Once the routing of traffic in steady state has been determined, the method 500 proceeds to block 504.

At block 504, the model generated at block 502 is used to determine how traffic will be routed through the transit AS in one or more failure scenarios. The term "failure scenario" is used herein to mean that one or more links and/or nodes are deemed to have failed. Each failure scenario is defined by the link(s) and/or node(s) that are deemed to have failed. In some cases determining how traffic will be routed in a failure scenario comprises analyzing each of the stored routing tables to determine if it comprises an entry that relates to a failed node or link and if it does, replacing the entry with the next prioritized next hop for that prefix, and then determining the route for each prefix based on the updated routing tables. An example method for determining how traffic will be routed in particular failure scenarios will be described with reference to FIGS. 8 and 9. Once it has been determined how traffic will be routed through the transit AS in one or more failure scenarios, the method 500 proceeds to block 506.

At block 506, the model generated at block 502 is used to determine the optimum routing of traffic through the transit AS in one or more failure scenarios. In some cases an iterative process is used to determine the optimum routing of traffic for a particular failure scenario that comprises determining a set of candidate routing solutions (each candidate routing solution providing a route for each prefix from each node in the network), evaluating the set of candidate routing solutions against one or more constraints, and evolving the set of candidate routing solutions until a stop condition is met. An example method for determining the optimum routing of traffic in a particular failure scenario is described with reference to FIGS. 10 to 12. Once the optimum routing of traffic through the transit AS in one or more failure scenarios has been determined the method 500 proceeds to block 508.

At block 508, the optimum routing determined in block 506 and the actual routing determined at block 504 are compared and used to determine what changes can be made to the transit AS network configuration to achieve the optimum routing. Changes that may be made to the transit AS network configuration include, for example, changing the local preference value for certain routes so that they will be selected in certain failure scenarios. However, it will be evident to a person of skill in the art that other configuration changes may be made to achieve the optimum routing.

Figure 6:
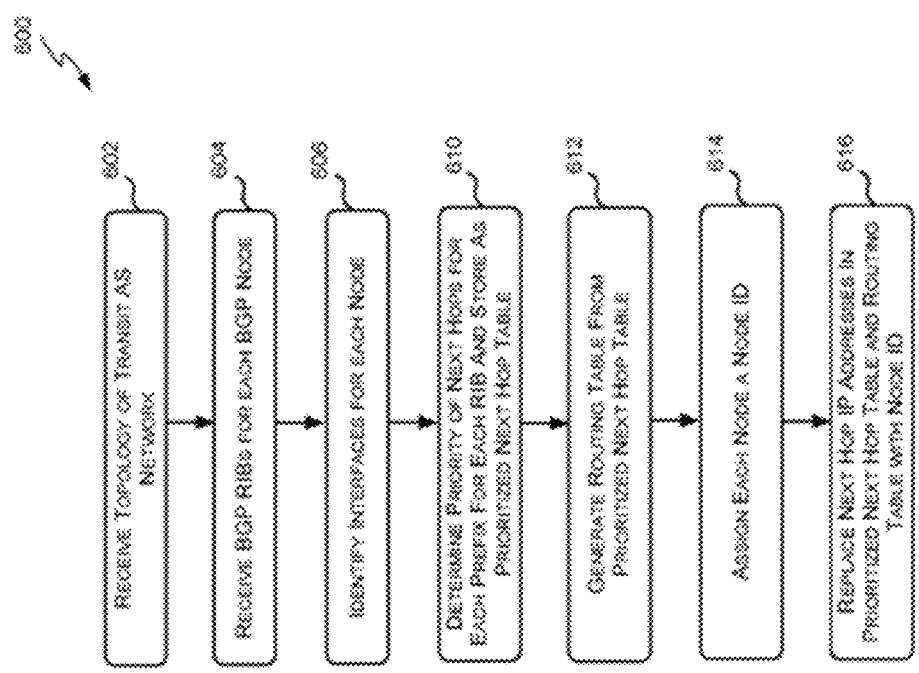

Reference is now made to FIG. 6 which illustrates a method 600 for generating a model of a transit AS network that uses BGP to route traffic from one AS to another AS. This type of transit AS may also be referred to herein as a BGP network. As noted above, one of the difficulties in generating a model for a transit AS network is the large amount of data that has to be stored and analyzed for each BGP router to determine the routing of traffic through the network. Accordingly, the method described with reference to FIG. 6 comprises reducing the routing data stored for each BGP node (each node running BGP) in the network to only a routing table that stores the next hop for each prefix and a next hop table that stores a prioritized list of next hops for each prefix.

The method 600 begins at block 602 where the topology of the transit AS network is received. The topology comprises a set of nodes (e.g. routers) and links connecting the nodes. The topology also identifies each of the nodes as being either a BGP node (e.g. a node that runs BGP) or an intermediate node (e.g. a node that is not running BGP). Once the topology has been received then the method 600 proceeds to block 604.

At block 604 the BGP RIB for each BGP node in the transit AS network is received. As described above with reference to FIG. 3 each BGP RIB (e.g. RIB 302) comprises routing information learned via BGP. In particular each BGP RIB comprises a list of prefixes the router has learned about via BGP and one or more routes to each prefix. Each route is defined by one or more routing parameters which may include, but are not limited to, status, a next hop, metric, local preference, weight and path as described above. Once the BGP RIB for each BGP node in the transit AS network has been received the method 600 proceeds to block 606.

At block 606, all of the next hop IP addresses in the BGP RIBs are identified and allocated to either one of the BGP nodes (e.g. BGP routers) in the AS or to an external node (e.g. a BGP peer node). In some cases this may be achieved by running a command on each BGP router, such as, "route config" or "show BGP route terse", to identify the IP addresses associated with that BPG router. It will be evident to a person of skill in the art that these are examples only and other commands and/or other methods may be used to identify the IP addresses associated with each BGP router. This results in each node of the transit AS and each peer node of the transit AS being associated with one or more IP addresses where each IP address indicates a particular interface of the node (e.g. router). Once the next hop IP addresses have been allocated the method proceeds to block 610.

At block 610, the BGP RIB for each BGP node is analyzed to generate a prioritized next hop table for each BGP node. The prioritized next hop table comprises an entry or row for each prefix that comprises a prioritized list of the next hops. Since each BGP RIB only identifies the best route (and thus the best next hop) for each prefix, not a prioritized list of the possible routes, generating the prioritized next hop table comprises determining the priority of possible next routes for each prefix.

The routes for each prefix are prioritized using the same best path algorithm used by the BGP router to determine or identify the best route for a prefix. Under the best path algorithm the first valid route is assigned as the current best route. The best route is then compared with the next route in the list according to a set of rules until the last valid route is reached. The rules that are used to determine the best route may vary by vendor.

The following are the rules used by Cisco® routers to determine the best route: (1) preferring the routes with the highest weight; (2) preferring the route with the highest local preference; (3) preferring the route that was locally originated via a network or aggregate BGP subcommand or through redistribution from IGP; (4) preferring the route with the shortest AS path (i.e. the least number of ASs in the path); (5) preferring the route with the lowest origin type; (6) preferring the route with the lowest multi-exit discriminator (Med); (7) preferring eBGP routes over iBGP routes; (8) preferring the route with the lowest IGP metric to the BGP next hop; (8) determining if multiple routes require installation in the routing table for BGP Multipath, if a best route is not yet select go to (9); (9) when both routes are external, preferring the route that was received first (the oldest one); (10) preferring the route that comes from the BGP router with the lowest router ID; (11) if the originator or router ID is the same for multiple routes, preferring the route with the minimum cluster list length; and (12) preferring the route that comes from the lowest neighbor address.

The following are the rules used by Juniper® routers to determine the best route: (1) preferring the route with the highest local preference; (2) preferring the route with the shortest AS path (i.e. the least number of ASs in the path); (3) preferring the route with the lowest origin code; (4) preferring the route with the lowest multi-exit discriminator (MED) metric; (5) preferring strictly internal paths, which include IGP routes and locally generated routes; (6) preferring strictly eBGP routes over external routes learned through iGBP; (7) preferring the route with the lowest IGP metric to the BGP next hop; (8) if both routes are external, preferring the currently active route to minimize route-flapping; (9) preferring the route from the peer with the lowest router ID; (10) preferring the route with the shortest cluster list length; and (11) preferring the route from the peer with the lowest peer IP address.

Generally, unless the network administrator has put measures in place to influence the result (e.g. set the weight or local preference values) the best path algorithm selects the route with the shortest AS path.

Accordingly, generating the next hop table comprises applying the appropriate best bath algorithm to the possible routes for each prefix to generate an ordered or prioritized list of routes (e.g. next hops) for each prefix.

An example prioritized next hop table and generation thereof from an example BGP RIB is described with reference to FIG. 7. Once the prioritized next hop table is generated, the method 600 proceeds to block 612.

At block 612, a routing table is generated for each BGP router from the corresponding prioritized next hop table generated at block 610. The routing table comprises an entry for each prefix that identifies the next hop for that prefix. The routing table for a BGP router is generated by selecting the best (or highest priority) next hop in the prioritized next hop table for each prefix and inserting it in the routing table. An example routing table and generation thereof from an example prioritized next hop table is described with reference to FIG. 7. Once a routing table has been generated for each BGP router the method 600 proceeds to block 614.

At block 614, each node in the transit AS network is assigned a unique node identifier (ID). In some cases the node ID is a sixteen bit number. However, it will be evident to a person of skill in the art that the node IDs may comprise a different number of bits or may have a different composition altogether (e.g. they may comprise other characters such as letters). Once each node has been assigned a node ID, the method 600 proceeds to block 616.

At block 616, each next hop IP address in the prioritized next hop tables is replaced with the node ID of the associated node. As described above, in block 606 each next hop IP address was associated or allocated to one of the nodes internal to the AS or to a BGP peer node. Since a node can be associated with more than one IP address, more than one IP address can be replaced by the same node ID.

Since the Node ID typically requires less bits than an IP address, using the Node ID instead of an IP address to identify the next hop significantly reduces the amount of memory required to store the prioritized next hop tables and the routing tables. Once each next hop IP address in the prioritized next hop tables is replaced with the node ID of the associated node the model is complete and the method 600 ends.

Figure 7:
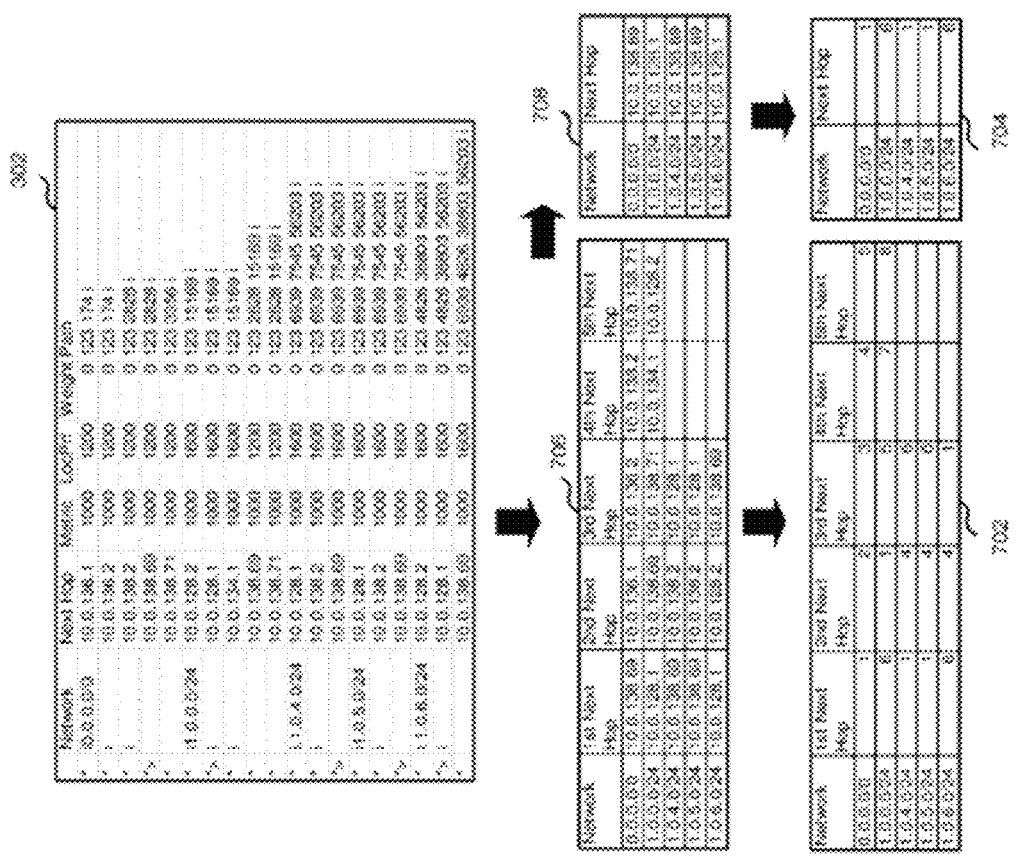
FIG. 7 is a schematic diagram illustrating generating prioritized prefix lists from an RIB.

Reference is now made to FIG. 7 which illustrates the generation of a prioritized next hop table 702 and a routing table 704 for a BGP router from the router's BGP RIB 302.

As described above, a BGP RIB comprises a list of prefixes and one or more possible routes to each of the prefixes. In particular, the example BGP RIB 302 of FIG. 7 comprises multiple routes for each of the following prefixes: 0.0.0.0/0; 1.0.0.0/24; 1.0.4.0/24; 1.0.5.0/24 and 1.0.6.0/24. In the example BGP RIB 302 of FIG. 7 the best route for each prefix is identified by a greater than sign ">", however, there is no indication given as to the relative priority or order of the remaining routes (e.g. the routes that are not a best route). To prioritize or order the remaining routes for each prefix the appropriate best path algorithm is applied to each of the remaining routes (e.g. the routes that are not a best route).

Once a priority or order has been given to the remaining routes for each prefix, the IP address for each route (including the best route) is stored in order in a preliminary prioritized next hop table 706. The preliminary prioritized next hop table comprises an entry or row for each prefix that lists the IP addresses of each possible next hop in order. For example, in FIG. 7 the best path algorithm identified the order or priority of the routes for prefix 1.0.0.0/24 as follows: 10.0.128.1, 10.0.138.69, 10.0.138.71, 10.0.134.1 and 10.0.128.2. As a result the IP addresses are listed in the preliminary next hop table 706 in that order. Where two IP addresses have the same priority based on the best path algorithm a tie-break such as the lowest IP address, may be used to select the order in which the IP addresses are listed in the preliminary prioritized next hop table 706.

Once the preliminary prioritized next hop table 706 has been populated with the ordered list of next hop IP addresses for each prefix, a preliminary routing table 708 is generated from the preliminary prioritized next hop table 706. The preliminary routing table 708 comprises an entry or row for each prefix that specifies the IP address of the best next hop. Accordingly, the preliminary routing table 708 can be generated by populating each row of the preliminary routing table 708 with the first or best next hop address of the corresponding row in the preliminary prioritized next hop table 706. As can be seen in FIG. 7 this results in the preliminary routing table 708 comprising the first two columns of the preliminary prioritized next hop table 706.

As described above, as part of the modeling method 600 of FIG. 6 each node is assigned a unique node identifier (ID).

In some cases the node IDs are sixteen bit numbers, however, it will be evident to a person of skill in the art that other formats may be used for the node IDs. To generate the final prioritized next hop table 702 and the final routing table 704 each IP address in the preliminary prioritized next hop table 706 and the preliminary routing table 708 is replaced with the Node ID of the associated node.

For example, if the nodes are assigned the Node identifiers shown in Table 1 then the preliminary tables 706 and 708 are converted into the final tables 702 and 704 respectively as shown in FIG. 7.

TABLE 1

| Node | IP Address | Node ID |
|------|------------|---------|
| A | 10.0.138.169 | 1 |
| B | 10.0.136.1 | 2 |
| C | 10.0.136.2 | 3 |
| D | 10.0.138.2 | 4 |
| E | 10.0.138.71 | 5 |
| F | 10.0.128.1 | 6 |
| G | 10.0.134.1 | 7 |
| H | 10.0.128.2 | 8 |

As described above, since the Node ID only requires enough bits to uniquely identify each node in the transit AS (which typically has less than 100 nodes) the Node ID requires less bits than the corresponding IP address. Accordingly the final tables 702 and 704 require significantly less memory than their counterpart preliminary tables 706 and 708.

Once the model has been generated it can be used, for example, to determine how traffic will be routed through the transit AS network in steady state (e.g. when all nodes and links are active or functioning) and/or in one or more fault scenarios (e.g. when one or more nodes and/or links have failed or are not functioning).

Figure 8:
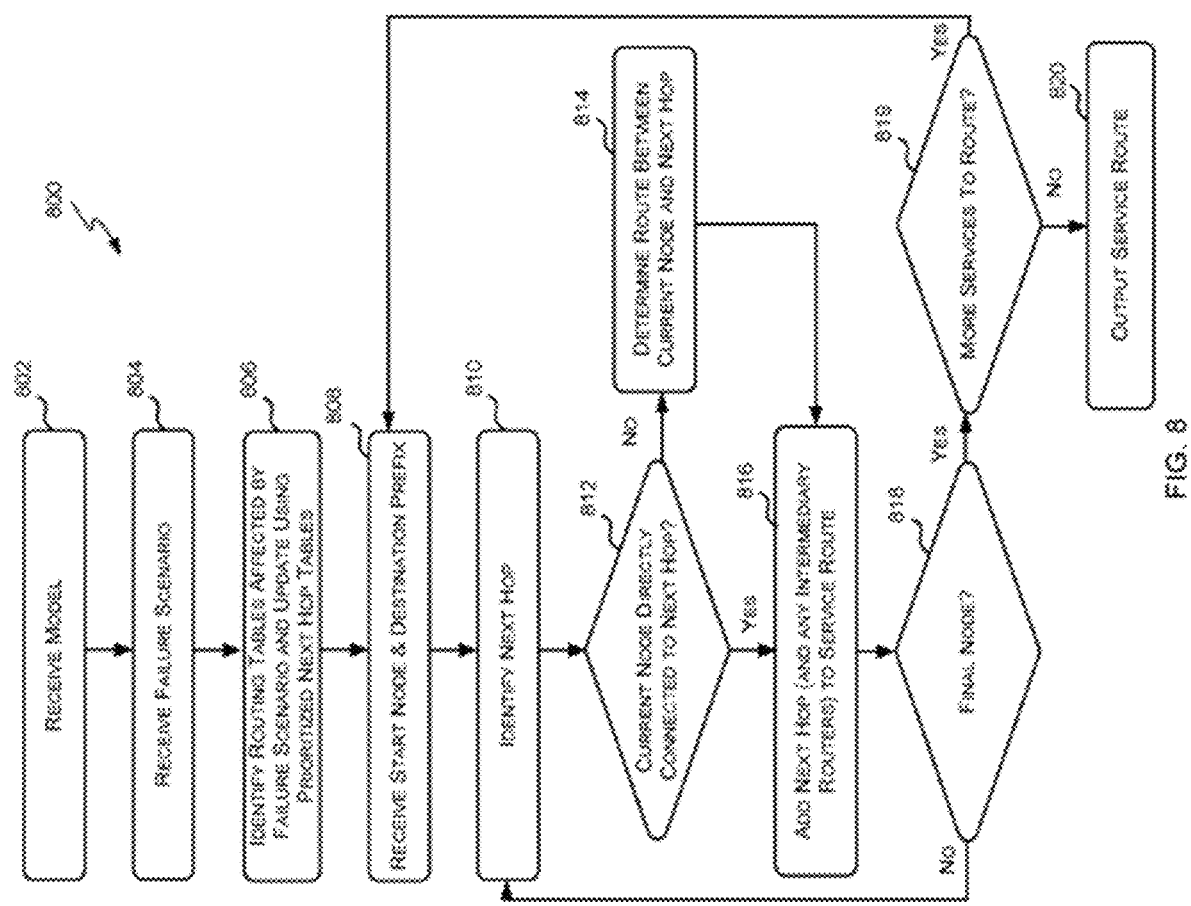
FIG. 8 is a flow diagram of an example method for determining how traffic will be routed through a transit AS after a failure.

Reference is now made to FIG. 8 which illustrates an example method 800 for determining how services will be routed through the transit AS network in a fault scenario using a model of the transit AS network generated in accordance with the method of FIG. 6.

The method begins at block 802 where the model of the transit AS network generated in accordance with the method of FIG. 6 is received. As described above the model comprises the nodes and links forming the network, and for each BGP node/router in the network, a routing table and a prioritized next hop table. Once the model of the transit AS network has been received the method 800 proceeds to block 804.

At block 804, the fault scenario is received. The fault scenario describes the network configuration to be analyzed. In particular, the fault scenario identifies one or more nodes and/or one or more links which are deemed to have failed. Where there are no node and link failures the network is said to be in steady state. Once the fault scenario has been received, the method 800 proceeds to block 806.

At block 806, the routing tables are analyzed to identify any entry that relates to one of the failed nodes and/or links (e.g. the next hop corresponds to a failed node or the next hop is accessible via a failed link). Such an entry is referred to as invalid entry since the next hop identified therein is not accessible in the failure scenario. Each entry identified as relating to one of the failed nodes and/or links is then replaced with the next valid next hop in the corresponding prioritized next hop table. For example, if the fault scenario identifies Node 5 as a failed node, and the routing table for Node 8 identifies the next hop for prefix 1.0.5.0/24 as Node 5, then the next hop for prefix 1.0.5.0/24 is replaced with the next hop for prefix 1.0.5.0/24 in the prioritized next hop table for Node 8. Once the routing tables have been updated to account for the failed nodes and/or links, the method 800 proceeds to block 808.

At block 808, information identifying the service to be routed is received. The information identifying the service may comprise the start node and the destination prefix. However, other information may be used to identify the service to be routed. Once the information identifying the service to be routed has been received, the method 800 proceeds to block 810.

At block 810, the routing table of the current node (e.g. initially the start node) is analyzed to determine the next hop (e.g. the next BGP router) for the destination prefix. For example, if the destination prefix is 1.0.5.0/24 then the entry in the routing table for the current node for prefix 1.0.5.0/24 is analyzed to identify the next hop. Once the next hop has been identified, the method 800 proceeds to block 812.

At block 812, it is determined whether the current node and the next hop node are directly connected. As described above, some BGP routers/nodes may be directly connected whereas other BGP router/nodes (e.g. internal BGP routers/nodes) may be indirectly connected (e.g. via other non-BGP routers). If the current node and the next hop node are not directly connected then the method 800 proceeds to block 814. If, however, the current node and the next hop node are directly connected then the method proceeds directly to block 816.

At block 814, the route between the current node and the next hop node is determined. In particular, determining the route between the current node and the next hop node comprises identifying the links and/or internal non-BGP routers/nodes that are traversed to get from the current node to the next hop node. In some cases determining the route between the current node and the next hop node comprises generating a list of nodes between the current node and the next hop node using the specific rules for the routing protocol used to transmit traffic between nodes. For example, where IP is used to route traffic between internal, non-BGP nodes, then the IP routing rules are used to determine how traffic is routed between internal, non-BGP nodes. Once the route between the current node and the next hop node is determined, the method 800 proceeds to block 816.

At block 816, the next hop node (and any nodes between the current node and the next hop node) is stored in the current path or routing list for the service. The next hop node then becomes the current node and the method 800 proceeds to block 818.

At block 818, it is determined whether the current node is the destination node. In some cases the current node may be determined to be the destination node if it is a peer node. In other cases the current node may be determined to be the destination node if it is a gateway node where the next hop for the destination prefix is a peer node. If it is determined that the current node is the final or destination node then the method 800 proceeds to block 819. If, however, it is determined that the current node is not the final or destination node then the method 800 proceeds back to block 810 where the next hop node from the current node is determined.

At block 819 it is determined whether there is at least one additional service to be routed through the AS. If there is at least one additional service to be routed through the AS then the method proceeds back to block 808 where blocks 808 to 819 are repeated for the next service (i.e. the next start node and destination prefix combination). It is determined that there are no more services to be routed through the AS, the method ends at block 820.

Figure 9:
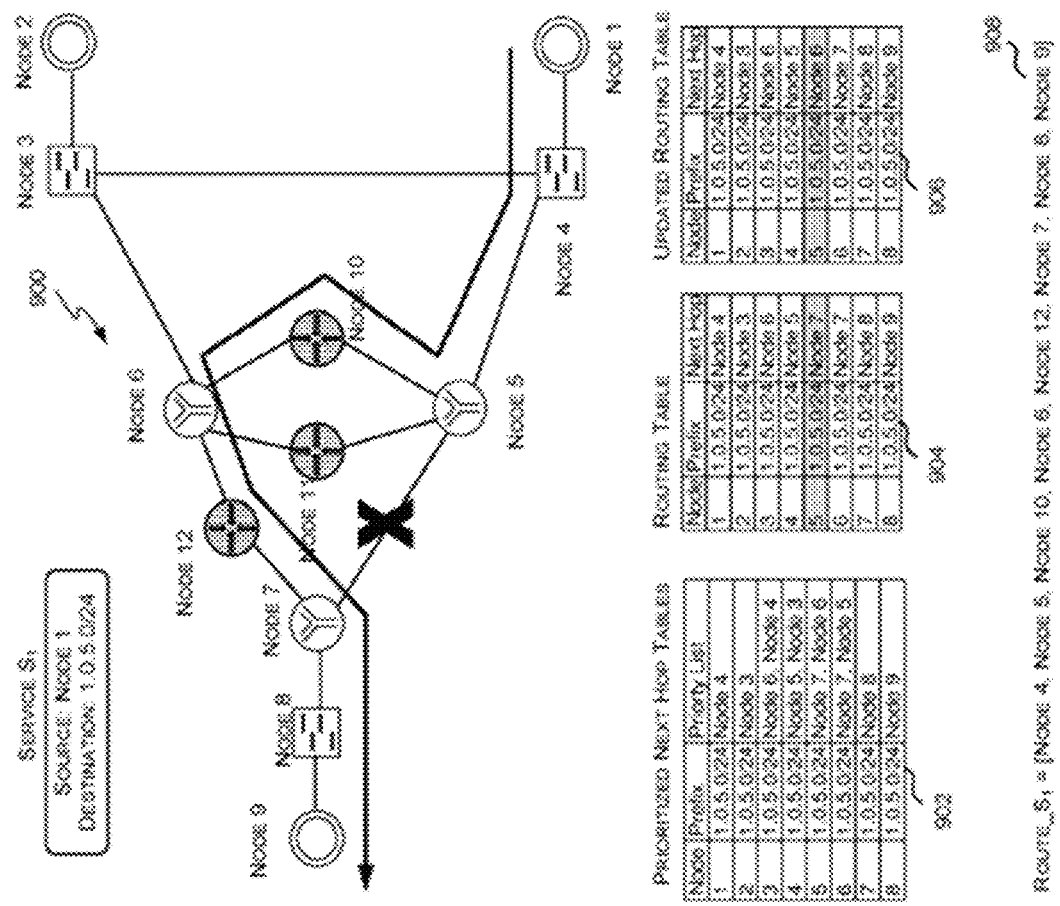
FIG. 9 is a schematic diagram illustrating determining how traffic for a prefix will be routes through a transit AS after a failure.

Reference is now made to FIG. 9 which illustrates how the route for a service (e.g. from a start node to a destination prefix) is determined using the method 800 of FIG. 8. In the example of FIG. 9 the transit AS network 900 comprises twelve nodes (Node 1 to Node 12). The routing tables for the nodes are summarized in the first table 904, and the prioritized next hop tables for the nodes are summarized in the second table 902. For ease of explanation, only the entries in the routing tables and prioritized next hop tables for prefix 1.0.5.0/24 are shown in FIG. 9, however, it would be evident to a person of skill in the art that the actual routing tables and prioritized next hop tables would have an entry for each of a plurality of prefixes.

The first step in determining the route for the service is updating the routing tables to replace any invalid next hops with valid next hops. In the example of FIG. 9 the fault scenario indicates that the link between Node 5 and Node 7 is deemed to have failed. This means that any entry in the routing table for Node 5 that has Node 7 as the next hop is invalid and any entry in the routing table for Node 7 that has Node 5 as the next hop is invalid. Since the second table 904 shows that the routing table for Node 5 has Node 7 as the next hop for prefix 1.0.5.0/24 there is an invalid entry in the fault scenario. This next hop is then replaced with the next valid next hop in the prioritized next hop table. It can be seen from the first table 902 that the next valid next hop for Node 5 for prefix 1.0.5.0/24 is Node 6. Accordingly, the routing table for Node 5 is updated so the next hop for prefix 1.0.5.0/24 is Node 6 instead of Node 7. This produces an updated set of routing tables which is summarized in the third table 906.

Once the routing tables have been updated to replace any invalid routes, the next step is to use the routing tables to determine the path through the network the service will take. In the example of FIG. 9, the service to be routed is defined by a start node of Node 1 and a destination prefix of 1.0.5.0/24. Looking at the network topology it can be seen that any traffic received from Node 1 will go to Node 4, thus Node 4 is stored in the service path or routing list 908.

Next the routing table of Node 4 is analyzed to determine the next hop for prefix 1.0.5.0/24. In the example of FIG. 9, the third table 906 indicates the next hop from Node 4 for prefix 1.0.5.0/24 is Node 5. Since Node 4 and Node 5 are directly connected Node 5 is stored in the service path or routing list 908. Next the routing table of Node 5 is analyzed to determine the next hop for prefix 1.0.5.0/24. In the example of FIG. 9, the third table 906 indicates the next hop from Node 5 for prefix 1.0.5.0/24 is Node 6. Since Node 5 and Node 6 are not directly connected the route between Nodes 5 and 6 is determined using one or more other protocols (e.g. IP). In the example of FIG. 9, the route between nodes 5 and 6 is determined to be via Node 10, thus Node 10 and Node 6 are stored in the service path or routing list 908.

This process is repeated for each subsequent node so that the complete route for the service (defined by Start Node 1 and destination prefix 1.0.5.0/24) comprises Node 4, Node 5, Node 10, Node 6, Node 12, Node 7, and Node 8. Since Node 9 is a peer node and thus not part of the internal transit AS network it may or may not be considered to form part of the path or route.

This process can be repeated for each service for the particular fault scenario to determine the utilization of each link in the network. As described above, the model can also be used to identify the optimum routing of a service or services through a network in a fault condition. The optimum routing can then be compared to the actual routing as determined by the method 800 of FIG. 8 to determine what changes, if any, can be made to the configuration of the transit AS network to achieve the optimum routing during the specific fault scenario.

Figure 10:
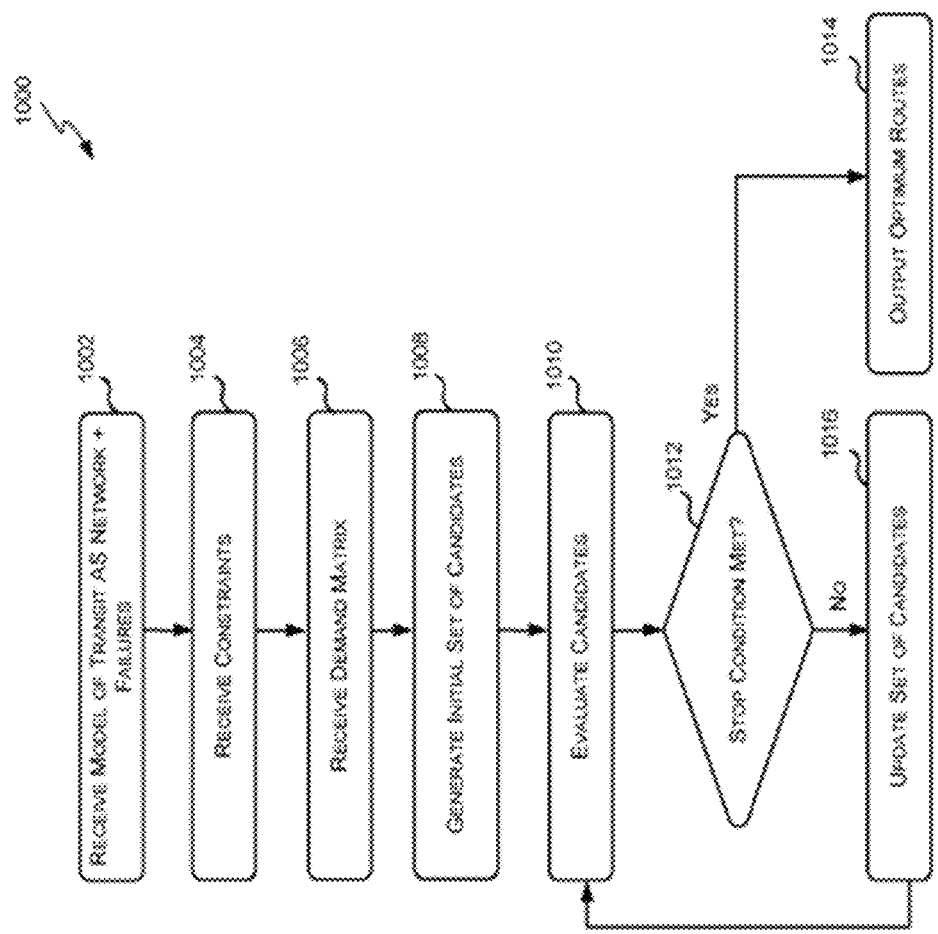
FIG. 10 is a flow chart illustrating an example method for determining the optimum route for each service through a transit AS after a failure.

Reference is now made to FIG. 10 which illustrates a method 1000 for identifying the optimum routing of traffic through a transit AS in a failure scenario using a model of the transit AS generated by the method 600 described with reference to FIGS. 6 and 7. The method 1000 identifies the optimum routing of traffic through an iterative process comprising generating a set of candidate routing solutions, evaluating the candidate routing solutions against one or more user specified constraints, and evolving or updating the set of candidate routing solutions to create a set of stronger candidate routing solutions. Since the quality of the candidate routing solutions increases with each iteration, each iteration increases the probability that the set of candidate routing solutions comprises the optimum routing solution.

The method 1000 begins at block 1002 where the model of the transit AS network generated by the method 600 described with reference to FIGS. 6 and 7 is received. As described above the model includes all of the nodes (e.g. routers) in the network and how they are interconnected, and a prioritized next hop table and routing table for each BGP node in the transit AS network. Since optimum routing is determined for a failure scenario the particular nodes and/or links that are considered to be failed in the scenario are also received. Once the model of the transit AS network and failure scenario have been received the method 1000 proceeds to block 1004.

At block 1004, a set of constraints is received which are used to evaluate the quality of candidate routing solutions.

The set of constraints includes one or more features (referred to as a constraint) that the candidate routing solutions are evaluated against. The set of constraints may be determined by the user, based on the way in which they wish to optimize the routing of services through their network. For example, one user may wish to minimize cost; another user may wish to generate the routing solution that provides the lowest latency regardless of the monetary cost; and yet another user may wish to achieve the best latency for a given cost. Example constraints include, but are not limited to, quality of service (QoS) dependent routing for traffic to/from certain peers, peering tariffs, and load balancing between an AS with multiple peer points.

The constraints may be classified as being either hard constraints or soft constraints. A hard constraint must be satisfied for the candidate routing solution to be a viable routing solution. Example hard constraints include, but are not limited to, minimum bandwidth, maximum delay, and adjacency limit. In contrast, a soft constraint is preferred and ideally should be optimized, but is not required. Example soft constraints include, but are not limited to, minimize cost and minimize delay.

Not all constraints may be of equal importance, so in some cases the set of constraints may comprise, in addition to a listing of the constraints themselves, weights indicating the relative importance of the constraints.

Once the set of constraints have been received the method 1000 proceeds to block 1006.

At block 1006, a demand matrix is received. The demand matrix provides a list of services to be routed through the network and the requirement of each service. A service is used herein to represents traffic that is sent from a peer node (referred to as the start node) to a particular prefix (referred to as the destination prefix). The requirement of a service is the amount of traffic that is sent from the start node to the destination prefix. An example demand matrix will be described with reference to FIG. 11. Once the demand matrix has been received the method 1000 proceeds to block 1008.

It will be evident to a person of skill in the art that blocks 1002 to 1006 may be executed in any order or in parallel. For example, the model and failure scenario, the constraints and the demand matrix may be received at the same time.

At block 1008, an initial set of M (e.g. 50) candidate routing solutions are generated. Each candidate routing solution comprises a proposed route for each service. In some cases each proposed route is represented by a vector of nodes that are traversed. The term "vector" is used herein to mean an ordered or unordered list of elements. An example candidate routing solution is described with reference to FIG. 12.

In some cases, some or all of the candidate routing solutions are randomly generated. Randomly generating a candidate routing solution may comprise randomly selecting some or all of the nodes in the model. Once the initial set of candidate routing solutions has been generated the method 1000 proceeds to block 1010.

At block 1010, each candidate routing solution (that has not already been evaluated) is evaluated to determine how well it satisfies the demands in the demand matrix and the one or more specified constraints.

In some cases evaluation of a candidate routing solution comprises assigning the candidate routing solution a fitness value that is a quantitative measure of how well the candidate routing solution meets the constraint(s) and the demands in the demand matrix.

In some cases generating a fitness value for a candidate routing solution may comprise (i) generating a sub-fitness value for each constraint where each sub-fitness value is a quantitative measure of how well the candidate routing solution meets the particular constraint; and (ii) combining (e.g. summing or averaging) the sub-fitness values to generate the fitness value for the candidate routing solution.

The candidate routing solutions may be evaluated (e.g. assigned a fitness value) serially or in parallel. For example, in some cases the candidate routing solutions are evaluated (e.g. assigned a fitness value) in parallel.

Once the set of candidate routing solutions have been evaluated, the method 1000 proceeds to block 1012.

At block 1012 it is determined whether at least one stop condition has been met and the iterative process can stop. The stop condition(s) may be, for example, if the best fitness value in the set of fitness values is within a predetermined percentage, x, of the optimum fitness value; if the best fitness value in the set of fitness values has not improved or changed after a predetermined number, y, of iterations; and/or the likelihood that the best fitness value in the set of fitness values is above a predetermined threshold. It will be evident to a person of skill in the art that these are examples only and other stop conditions may be used.

If it is determined that at least one stop condition has been met then the method 1000 proceeds to block 1014 where the best candidate routing solution is selected and output as the optimum routing solution. A person of skill in the art can then use the optimum routing information to update the BGP configuration (e.g. BGP metrics) of one or more of the BGP routers and/or routes to enforce the optimum routing. In some cases the best candidate routing solution is the candidate routing solution with the best fitness value. If, however, no stop conditions are met then the method 1000 proceeds to block 1016.

At block 1016, the set of candidate routing solutions is evolved in an attempt to increase the quality of the candidate routing solutions in the set. In particular, it is very unlikely that the initial set of candidate routing solutions comprises the optimum routing solution therefore the set of candidate routing solutions is evolved to pull the candidate routing solutions closer to the optimum routing solution.

In some cases evolving the set of candidate routing solutions comprises selecting one or more of the candidate routing solutions, generating one or more new candidate routing solutions from the selected candidate routing solutions and replacing the worse candidate routing solutions in the set with the new candidate routings solutions if the new candidate routing solutions are better (e.g. based on a fitness value) than the candidate routing solutions in the set.

For example, in some cases a plurality of parent candidate routing solutions are selected from the set of candidate routing solutions. The parent candidate routing solutions may be the candidate routing solutions with the best fitness values or the parent candidate routing solutions may be selected using some other criteria (e.g. they may be randomly selected). One or more child candidate routing solutions are then generated from the parent candidate routing solutions using known techniques such as mating, mutation or a combination thereof and the child candidate routing solutions are added to the set of candidate routing solutions.

The method then proceeds back to block 1010 where each of the child candidate routing solutions is evaluated and the set of candidate routing solutions is updated to include the best M candidate routing solutions where M is the number of candidate routing solutions initially generated in block 1008. This process of evolving the set of the candidate routing solutions is repeated until a stop condition is satisfied.

Although the method of FIG. 10 is described as identifying the optimum routing of traffic through a transit AS in a failure scenario, the method can also be used to identify the optimum routing of traffic through a transit AS in steady state.

Figure 11:
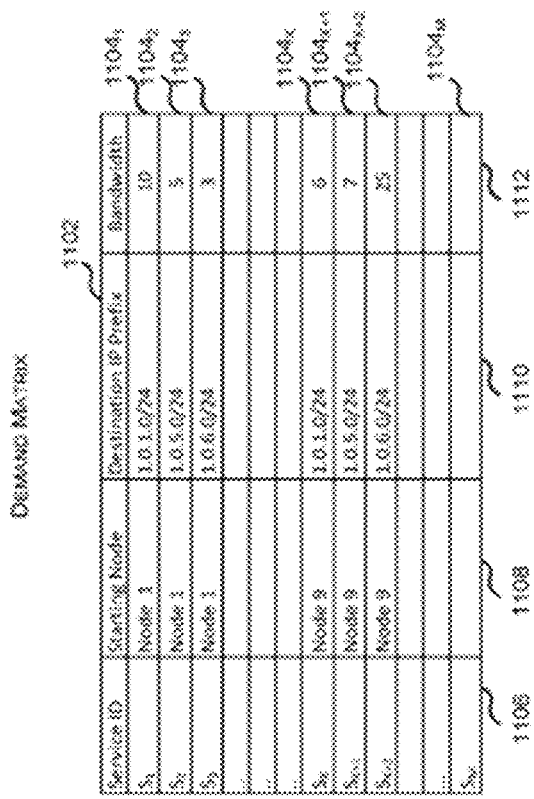
FIG. 11 is a table illustrating an example prefix demand matrix.

Reference is now made to FIG. 11 which illustrated an example demand matrix 1102. As described above the demand matrix provides a list of services to be routed through the network and the requirement of each service. The term "service" is used herein to represent traffic that is sent from a peer node to a particular prefix. The requirement or demand of a service is the amount of traffic that is sent from the peer node to the prefix.

The demand matrix 1102 of FIG. 11 comprises a number of rows $1104_1$-$1104_M$ and columns 1106, 1108, 1110 and 1112. Each row $1104_1$-$1104_M$ corresponds to a service that runs over the network. Accordingly, where there are M services there are M rows in the demand matrix 1102. In some cases each possible combination of start nodes and destination prefixes is represented by a service. For example, where a network has four possible start nodes and four destination prefixes there are 4*3=12 possible combinations of start nodes and prefixes thus the demand matrix would have twelve rows.

Each column 1106, 1108, 1110 and 1112 provides information on the corresponding service. In the demand matrix 1102 of FIG. 11, the first column 1106 is used for the service identifier (e.g. $S_1$) which uniquely identifies the service. The second column 1108 is used to identify the start node of the service. In some cases the start nodes may be identified by the node ID assigned as part of the model generation process. The third column 1110 is used to identify the destination prefix. The fourth column 1112 is used to identify the demand or requirement for the service (e.g. the amount of traffic that is sent from the specified source node to the specified destination prefix). Each requirement may be represented by a capacity or bandwidth value (e.g. 10 Gbps).

It will be evident to a person of skill in the art that the demand matrix 1102 of FIG. 11 is an example only and the demand matrix may comprise additional or alterative information; or the services and the requirements thereof may be represented in a different manner.

Figure 12:
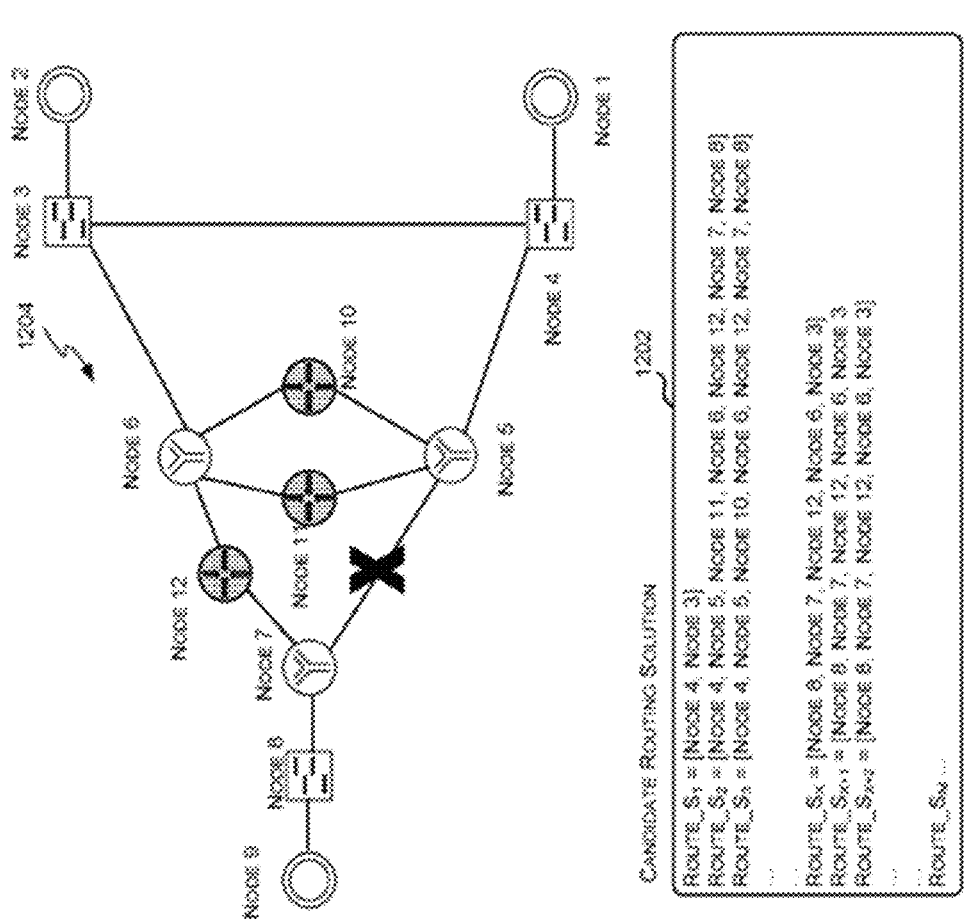
FIG. 12 is a schematic diagram illustrating generating a candidate routing solution.

Reference is now made to FIG. 12 which illustrates an example of generating a candidate routing solution 1202 from a model of a transit AS network 1204. In FIG. 12 the transit AS network comprises twelve interconnected nodes. As described above, as part of the modeling process each node is assigned a label or identifier (Node 1 ... Node 12) which uniquely identifies the node.

A candidate routing solution comprises a route through the network for each service. A route for a service comprises a combination of the nodes in the network. Accordingly, a route may comprise all or a subset of the nodes in the network. The combination of nodes may be represented by an array or vector. In one example, the array or vector may comprise an ordered list of node IDs.

The candidate routing solutions may be generated in any suitable manner. For example, the candidate routing solutions may be randomly generated, the shortest paths may be selected as the candidate routing solutions, some constraints may be ignored in selecting the candidate routing solutions, the candidate routing solutions may be selected using swarming techniques, or the candidate routing solutions may be selected using a divergent/convergent path method. In other cases these methods may be combined to generate the candidate routing solutions. In some cases one or more of the candidate routing solutions may be seeded while the remainder are randomly selected.

For example, FIG. 11 illustrates a candidate routing solution 1202 that may be generated for the model transit AS network 1204. The candidate routing solution 1202 comprises a route for each service in the demand matrix 1102. For example the route for service $S_1$ comprises nodes 4 and 3; the route for service $S_2$ comprises nodes 4, 5, 11, 6, 12, 7 and 8; the route for service $S_3$ comprises nodes 4, 5, 10, 6, 12, 7 and 8; the route for service $S_x$ comprises nodes 8, 7, 12, 6 and 3; the route for service $S_{x+1}$ comprises nodes 8, 7, 12, 6 and 3; and the route for service $S_{x+2}$ comprises nodes 8, 7, 12, 6, and 3.

Figure 13:
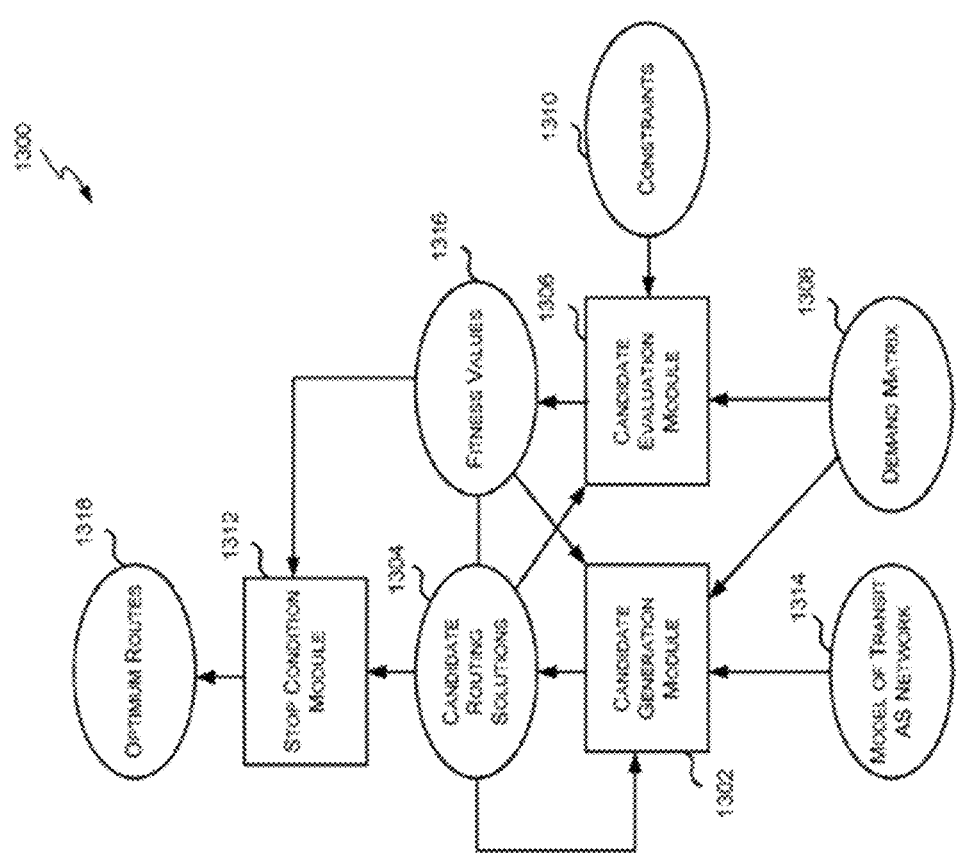
FIG. 13 is a block diagram of an example system for implementing the method of FIG. 10.

Reference is now made to FIG. 13 which illustrates an example system 1300 for implementing the method 1000 of FIG. 10.

The system 1300 comprises a candidate generation module 1302 for generating and iteratively evolving the set of candidate routing solutions 1304; a candidate evaluation module 1306 for evaluating the candidate routing solutions 1304 to determine how well they meet the demands set out in the demand matrix 1308 and the one or more constraints 1310; and a stop condition module 1312 for determining, based on the evaluation of the candidate routing solutions 1304, when the iterative process can be stopped.

The candidate generation module 1302 receives the model of a transit AS network 1314 generated by the method 600 of FIG. 6 and the demand matrix 1308 and generates the set of candidate routing solutions 1304. As described above with respect to FIG. 12 each candidate routing solution comprises a route through the network for each service. Each route comprises an ordered set of nodes of the network. In some cases each route may be represented by a vector that comprises an ordered list of the nodes forming the route. An example candidate routing solution was described with reference to FIG. 12.

In some cases the candidate generation module 1302 is configured to initially generate a predetermined number M, in one example 50, candidate routing solutions 1304.

The candidate generation module 1302 is also configured to periodically update or evolve the set of candidate routing solutions 1304 by selecting one or more candidate routing solutions from the set of candidate routing solutions 1304, forming new candidate routing solutions from the selected candidate routing solutions (e.g. via mutation, mating (e.g. crossover), and/or a combination thereof), and replacing poorer candidate routing solutions with the new candidate routing solutions if they are better.

The candidate evaluation module 1306 evaluates each of the candidate routing solutions 1304 based on how well the candidate routing solution satisfies the demands in the demand matrix 1308 and the one or more specified constraints 1310.

As described above, the demand matrix 1308 provides a list of services to be routed through the network and the requirements of the service. A service represents traffic that is sent from a start node to a destination prefix. The requirement of a service is the amount of traffic sent between the start node and the destination prefix. An example demand matrix was described with reference to FIG. 11.

In some cases the candidate evaluation module 1306 is configured to generate a fitness value 1316 for each candidate routing solution based on the demands specified in the demand matrix 1308 and the set of constraints 310. The fitness value 1316 provides a quantitative measure of how well the candidate routing solution meets the demands specified in the demand matrix 308 and the set of constraints 310. In some cases, the higher the fitness value the better the candidate, and the lower the fitness value the poorer the candidate. In some cases the fitness value is a number between 0 and 1 where 1 indicates an optimum candidate and 0 indicates a very poor candidate.

The fitness value 1316 for a particular candidate routing solution may be computed by calculating a sub-fitness value for each constraint; and combining the sub-fitness values (e.g. summing or averaging). In some cases the constraints are not of equal importance so the fitness value may take into account the relative importance of the constraints. For example, the fitness value may be a weighted sum or a weighted average of sub-fitness values where the weight used for each sub-fitness value indicates the relative importance of the corresponding constraint.

The stop condition module 1312 determines when the iterative process of evaluating and updating/evolving the candidate routing solutions 1304 can end. In particular, the stop condition module 1312 determines that the iterative process can stop if at least one stop condition has been met. One or more stop conditions may indicate that a sufficiently optimum routing solution has been identified For example, the stop conditions may comprise one or more of: if the best fitness value in the set of fitness values 1316 is within a predetermined percentage, x, of the optimum fitness value; if the best fitness value in the set of fitness values 1316 has not improved or changed after a predetermined number, y, of iterations; or if the best fitness value has a percentage likelihood of being the optimum fitness value over a predetermined threshold.

If the stop condition module 1312 determines that at least one stop condition is met then the stop condition module 1312 selects the candidate routing solution or solutions that has/have the best fitness value and outputs the selected routing solutions or solutions at the optimum routing solution 1318.

Figure 14:
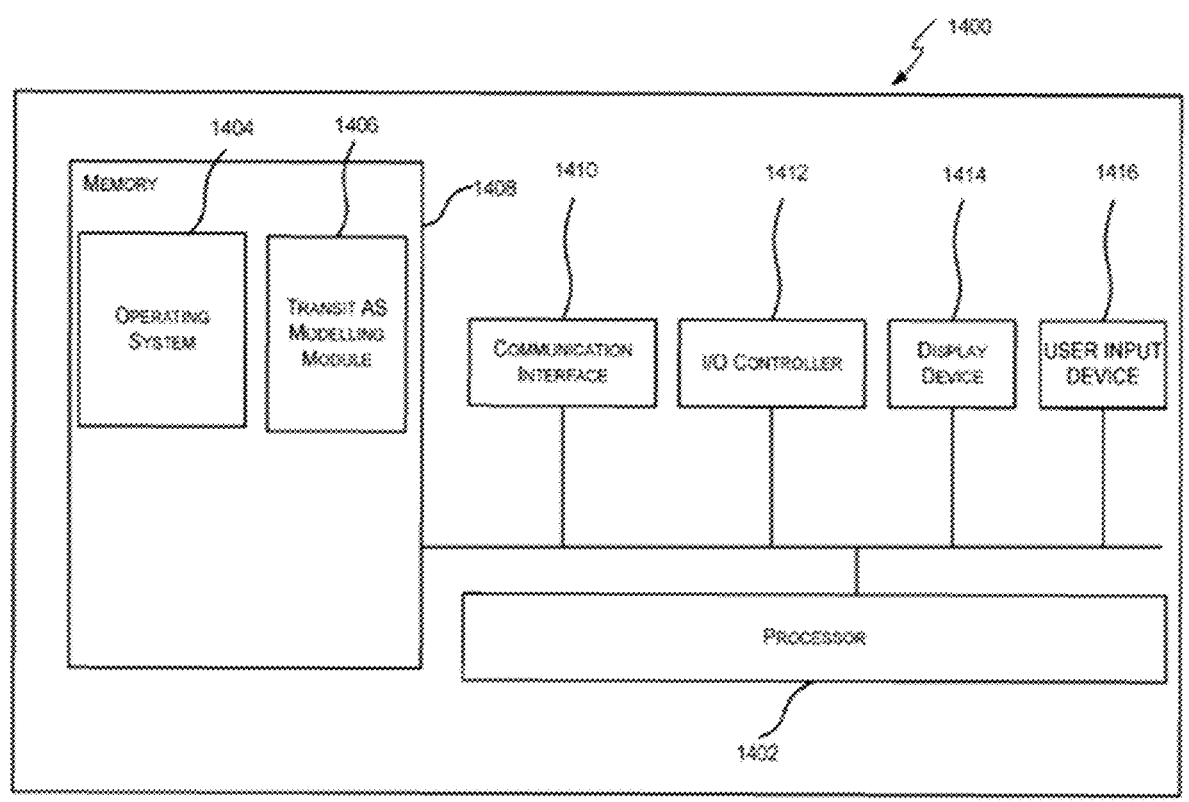
FIG. 14 is a block diagram of an example computing-based device.

Reference is now made to FIG. 14 which illustrates various components of an exemplary computing-based device 1400 which may be implemented as any form of a computing and/or electronic device, and in which embodiments of the methods and systems described herein may be implemented.

Computing-based device 1400 comprises one or more processors 1402 which may be microprocessors, controllers or any other suitable type of processors for processing computer executable instructions to control the operation of the device in order to identify the bandwidth requirements of multiple services running over a network. In some examples, for example where a system on a chip architecture is used, the processors 1402 may include one or more fixed function blocks (also referred to as accelerators) which implement a part of the any of the methods of generating a model of a transit AS network, using the model to determine the routing of traffic in a failure scenario, and using the model to determine the optimum routing of traffic in a failure scenario in hardware (rather than software or firmware). Platform software comprising an operating system 1404 or any other suitable platform software may be provided at the computing-based device to enable application software 1406, such as a transit AS model generating module to be executed on the computing based device 1400.

The computer executable instructions may be provided using any computer-readable media that is accessible by computing based device 1400. Computer-readable media may include, for example, computer storage media such as memory 1408 and communications media. Computer storage media (i.e. non-transitory machine readable media), such as memory 1208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1408) is shown within the computing-based device 1400 it will be appreciated that the storage may be distributed or located remotely and accessed via a network or other communication link (e.g. using communication interface 1410).

The computing-based device 1400 also comprises an input/output controller 1412 arranged to output display information to a display device 1414 which may be separate from or integral to the computing-based device 1400. The display information may provide a graphical user interface. The input/output controller 1412 is also arranged to receive and process input from one or more devices, such as a user input device 1416 (e.g. a mouse or a keyboard). In an embodiment the display device 1414 may also act as the user input device 1416 if it is a touch sensitive display device. The input/output controller 1412 may also output data to devices other than the display device, e.g. a locally connected printing device (not shown in FIG. 14).

The term 'processor' and 'computer' are used herein to refer to any device, or portion thereof, with processing capability such that it can execute instructions. The term 'processor' may, for example, include central processing units (CPUs), graphics processing units (CPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A computer-implemented method comprising:
   generating, by a computer, a model of a transit autonomous system network, the model comprising a plurality of nodes forming the transit autonomous system network, the plurality of nodes comprising a plurality of border gateway protocol nodes, each border gateway protocol node is associated with a routing table and a prioritized next hop table;
   receiving, by the computer, a fault scenario identifying a failed node of the plurality of nodes;
   identifying, by the computer, one or more routing tables associated with the failed node;
   identify, by the computer, an entry in the one or more routing tables associated with the failed node, wherein the entry corresponds to an invalid next hop;
   replacing, by the computer, each entry in the one or more routing tables with each next valid next hop in a corresponding prioritized next hop table to generate an updated routing table;
   receiving, by the computer, information identifying a service to be routed through the transit autonomous system network, wherein the information comprises a start node and a destination prefix;
   identifying, by the computer, a next hop for the destination prefix by analyzing the updated routing table associated with the start node;
   determining, by the computer, whether the start node is directly connected to the next hop;
   when the start node is directly connected to the next hop, determining, by the computer, a route between the start node and the next hop by identifying nodes that are traversed to get from the start node to the next hop;
   adding, by the computer, the next hop and the nodes between the start node and the next hop to the route, wherein the next hop is designated as a current node; and
   routing, by the computer, the service through the route.

2. The computer-implemented method of claim 1, wherein the model comprising a plurality of links, and wherein the plurality nodes and the plurality of links form the transit autonomous system network.

3. The computer-implemented method of claim 1, wherein fault scenario identifies a failed link.

4. The computer-implemented method of claim 3, wherein the one or more routing tables are further associated with the failed link.

5. The computer-implemented method of claim 4, wherein the entry is further associated with the failed node.

6. The computer-implemented method of claim 1, further comprising:
   generating, by the computer, the prioritized next hop table from a routing information base for each border gateway protocol node.

7. The computer-implemented method of claim 6, wherein the routing information base for each border gateway protocol node comprises at least one route for each of plurality of internet protocol prefixes.

8. The computer-implemented method of claim 7, wherein the prioritized next hop table comprising a prioritized list of next hops for each internet protocol prefix.

9. The computer-implemented method of claim 1, further comprising:
   determining, by the computer, the current node to be a destination node when the current node is a peer node or a gateway node.

10. The computer-implemented method of claim 9, further comprising:
    determining, by the computer, the service to be routed through the route when the current node is the destination node.

11. A system comprising:
    a memory; and
    a processor in communication with the memory, the processor configured to:
    generate a model of a transit autonomous system network, the model comprising a plurality of nodes forming the transit autonomous system network, the plurality of nodes comprising a plurality of border gateway protocol nodes, each border gateway protocol node is associated with a routing table and a prioritized next hop table;
    receive a fault scenario identifying a failed node;
    identify one or more routing tables associated with the failed node;
    analyze the one or more routing tables to identify an entry associated with the failed node, the entry corresponds to an invalid next hop;
    replace each entry in the one or more routing tables with each next valid next hop in a corresponding prioritized next hop table to generate an updated routing table;
    receive information identifying a service to be routed through the transit autonomous system network, wherein the information comprises a start node and a destination prefix;

identify a next hop for the destination prefix by analyzing the updated routing table associated with the start node;

determine whether the start node is directly connected to the next hop;

when the start node is directly connected to the next hop, determine a route between the start node and the next hop by identifying nodes that are traversed to get from the start node to the next hop;

add the next hop and the nodes between the start node and the next hop to the route, wherein the next hop is designated as a current node; and route the service through the route.

12. The system of claim 11, wherein the model comprising a plurality of links, and wherein the plurality nodes and the plurality of links form the transit autonomous system network.

13. The system of claim 11, wherein fault scenario identifies a failed link.

14. The system of claim 13, wherein the one or more routing tables are further associated with the failed link.

15. The system of claim 14, wherein the entry is further associated with the failed node.

16. The system of claim 11, wherein the processor is further configured to generate the prioritized next hop table from a routing information base for each border gateway protocol node.

17. The system of claim 16, wherein the routing information base for each border gateway protocol node comprises at least one route for each of plurality of internet protocol prefixes.

18. The system of claim 17, wherein the prioritized next hop table comprising a prioritized list of next hops for each internet protocol prefix.

19. The system of claim 11, wherein the processor is further configured to determine the current node to be a destination node when the current node is a peer node or a gateway node.

20. The system of claim 19, wherein the processor is further configured to determine the service to be routed through the route when the current node is the destination node.

* * * * *